US012785931B2

(12) United States Patent
Roy

(10) Patent No.: US 12,785,931 B2
(45) **Date of Patent: *Nov. 3, 2026**

(54) HASH BASED KEY VALUE TO BLOCK TRANSLATION METHODS AND SYSTEMS

(71) Applicant: Samsung Electronics Co., Ltd., Suwon-si (KR)

(72) Inventor: Somnath Roy, San Ramon, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,231

(22) Filed: Jun. 10, 2024

(65) Prior Publication Data

US 2024/0405971 A1 Dec. 5, 2024

Related U.S. Application Data

(63) Continuation of application No. 17/321,326, filed on May 14, 2021, now Pat. No. 12,010,214.

(60) Provisional application No. 63/139,655, filed on Jan. 20, 2021.

(51) Int. Cl.
*H04L 9/06* (2006.01)
*H04L 9/08* (2006.01)

(52) U.S. Cl.
CPC .......... *H04L 9/0643* (2013.01); *H04L 9/0861* (2013.01); *H04L 9/0891* (2013.01); *H04L 9/0894* (2013.01)

(58) Field of Classification Search
CPC ... H04L 9/0643; H04L 9/0861; H04L 9/0891; H04L 9/0894
USPC .......................................................... 713/171
See application file for complete search history.

(56) References Cited

U.S. PATENT DOCUMENTS

| | | | |
|---|---|---|---|
| 8,874,842 B1 | 10/2014 | Kimmel et al. | |
| 2010/0217953 A1* | 8/2010 | Beaman | G06F 16/2255 711/216 |
| 2016/0048332 A1 | 2/2016 | Kimmel et al. | |
| 2018/0089074 A1 | 3/2018 | Li et al. | |
| 2019/0042571 A1 | 2/2019 | Li et al. | |
| 2019/0278849 A1 | 9/2019 | Chandramouli et al. | |
| 2019/0384530 A1* | 12/2019 | Twitto | G06F 3/0679 |
| 2020/0014688 A1 | 1/2020 | Kohli et al. | |
| 2020/0134049 A1 | 4/2020 | Bassov et al. | |
| 2020/0136971 A1* | 4/2020 | Cohen | H04L 9/0833 |

(Continued)

FOREIGN PATENT DOCUMENTS

CN 110196784 A 9/2019

*Primary Examiner* — Chau Le
*Assistant Examiner* — Phuc Pham
(74) *Attorney, Agent, or Firm* — Womble Bond Dickinson (US) LLP

(57) ABSTRACT

A method is described that includes computing a first index based on a hash of a first key for a first object to be stored in a memory device, determining an availability of a first segment on the memory device corresponding to the first index, computing a second index based on the hash of the first key for the first object, in response to determining that the first segment corresponding to the first index is unavailable for storage, determining an availability of a second segment on the memory device corresponding to the second index, and adding an indicator of a location of the second segment to a collision table in a first metadata of the first segment.

20 Claims, 7 Drawing Sheets

(56) References Cited

U.S. PATENT DOCUMENTS

| | | | |
|---|---|---|---|
| 2020/0226000 | A1 | 7/2020 | Wolfson et al. |

* cited by examiner

FIG. 7

```
STRUCT ONDISK_META{
   CHAR    KEY[32];
   CHAR    CHECHSUM[16];
   UINT8_T   NUM_VALID_COL_ENTRY;
   STRUCT COL_MAP{
     UINT32_T META_COLLISION_OFFSET;
     CHAR COLLISION_KEY_HASH[32];
   };
 COL_MAP COLLISION_TBL [MAX_COLTBL_SIZE];
 UINT64_T VALUE_SIZE; //IF VALUE_SIZE=0, IT IS JUST HOLDING THE SEGMENT TO SERVE OTHER COLLISION KEYS
 UINT8_T VALUE_LOCATION; //0=ALONG WITH META, 1=NEXT ADJACENT SEGMENT, 2=REMOTE, 3=SOME ADJACENT
AND SOME REMOTE
 UINT8_T NUM_VALID_PLACE_VALUE_ENTRY
  STRUCT VALUE_LOC{
     UINT64_T VALUE_OFFSET; //IN CASE NOT WITHIN META
     UINT16_T NUM_CHUNKS;
  };
  VALUE_LOC PLACE_VALUE[MAX_VALUE_SCATTER]
  UINT8_ VALUE_BUFFER[MAX_INLINE_VALUE]; //SMALL VALUES WE CAN CLUB TOGETHER WITH META
};
```

HASH BASED KEY VALUE TO BLOCK TRANSLATION METHODS AND SYSTEMS

CROSS-REFERENCE TO RELATED APPLICATION

This is a continuation application of U.S. patent application Ser. No. 17/321,326, filed May 14, 2021, now U.S. Pat. No. 12,010,214, which claims priority to U.S. Provisional Patent Application No. 63/139,655 filed on Jan. 20, 2021, which is incorporated herein by reference in its entirety.

FIELD

The present application relates to key value systems, and more particularly to hashed based efficient key value to block translation methods and systems.

BACKGROUND

Some storage devices are unable to communicate with applications (e.g., software application) without relying on translators to convert key value to block and vice versa. Conventional techniques are resource heavy and have high overheads. Additionally, some techniques do not work well when scaled. Therefore, more efficient translations techniques are desired.

SUMMARY

According to an embodiment a method is described. The method may include: computing a first index based on a hash of a first key for a first object to be stored in a memory device; determining an availability of a first segment on the memory device corresponding to the first index; computing a second index based on the hash of the first key for the first object, in response to determining that the first segment corresponding to the first index is unavailable for storage; determining an availability of a second segment on the memory device corresponding to the second index; and adding an indicator of a location of the second segment to a collision table in a first metadata of the first segment.

The method may further include writing the first object to the second segment in response to determining that the second segment is available.

The computing the second index may include extracting a bit from every byte of the hash to form the second index.

The determining the availability of the first segment includes reading a status identifier from the first metadata, wherein the status identifier indicates a status that corresponds to the first segment being unavailable for storage.

The method may further include writing, to the collision table, an association between the hash of the first key and the indicator of the location of the second segment, in response to the collision table being empty.

The computing the first hash comprises computing using a Secure Hash Algorithm 256 (SHA-256).

The method may further include: receiving a get request indicating the first key; computing the first index based on the hash of the first key; reading the first metadata of the first segment corresponding to the first index; determining that the hash of the first key is inconsistent with a stored hash stored in the first metadata, in response to reading the first metadata; reading the collision table in the first metadata to determine that the first object is stored in the second segment; and retrieving the first object from the second segment, in response to reading the collision table.

The method may further include: receiving a delete request identifying the first key; computing the first index based on the hash of the first key; reading the first metadata of the first segment corresponding to the first index; determining that the hash of the first key is inconsistent with a stored hash stored in the first metadata, in response to reading the first metadata; reading the collision table in the first metadata to determine that that first object is stored in the second segment; and deleting the first object from the second segment, in response to reading the collision table.

The method may further include: receiving a delete request identifying the first key; computing the first index based on the hash of the first key; reading the first metadata of the first segment corresponding to the first index; determining that the hash of the first key is consistent with a stored hash stored in the first metadata, in response to reading the first metadata; determining that the collision table in the first metadata comprises the indicator of the location of the second segment; setting a value size of the collision table to zero; and deleting the first object from the second segment.

The method may further include: receiving a delete request identifying the first key; computing a first index based on the hash of the first key; reading the first metadata of the first segment corresponding to the first index; determining that the hash of the first key is consistent with a stored hash stored in the first metadata, in response to reading the first metadata; determining that the collision table in the first metadata is empty, in response to determining that the hash of the first key is consistent with the stored hash stored in the first metadata; and deleting the first object from the second segment, in response to reading the collision table.

According to another embodiment, an object storage system configured to store objects is described. The object storage system may include a memory device that is divided into segments, the memory device configured to: compute a first index based on a hash of a first key for a first object to be stored in a memory device; determine an availability of a first segment on the memory device corresponding to the first index; compute a second index based on the hash of the first key for the first object, in response to determining that the first segment corresponding to the first index is unavailable for storage; determine an availability of a second segment on the memory device corresponding to the second index; and adding an indicator of a location of the second segment to a collision table in a first metadata of the first segment.

The memory device is may be configured to write the first object to the second segment in response to determining that the second segment is available.

The computing the second index includes extracting a bit from every byte of the hash to form the second index.

The determining the availability of the first segment includes reading a status identifier from the first metadata, wherein the status identifier indicates a status that corresponds to the first segment being unavailable for storage.

The memory device may be further configured to write to the collision table, an association between the hash of the first key and the indicator of the location of the second segment, in response to the collision table being empty.

The computing the first hash includes computing using a Secure Hash Algorithm 256 (SHA-256).

The memory device may be further configured to: receive a get request indicating the first key; compute the first index based on the hash of the first key; read the first metadata of the first segment corresponding to the first index; determine that the hash of the first key is inconsistent with a stored hash stored in the first metadata, in response to reading the first metadata; read the collision table in the first metadata to determine that the first object is stored in the second segment; and retrieve the first object from the second segment, in response to reading the collision table.

The memory device may be further configured to: receive a delete request identifying the first key; compute a first index based on the hash of the first key; read the first metadata of the first segment corresponding to the first index; determine that the hash of the first key is inconsistent with a stored hash stored in the first metadata, in response to reading the first metadata; read the collision table in the first metadata to determine that that first object is stored in the second segment; and delete the first object from the second segment, in response to reading the collision table.

The memory device may be further configured to: receive a delete request identifying the first key; compute a first index based on the hash of the first key; read the first metadata of the first segment corresponding to the first index; determine that the hash of the first key is consistent with a stored hash stored in the first metadata, in response to reading the first metadata; determine that the collision table in the first metadata is comprises the indicator of the location of the second segment; set a value size of the collision table to zero; and delete the first object from the second segment.

The memory device is further configured to: receive a delete request identifying the first key; compute a first index based on the hash of the first key; read the first metadata of the first segment corresponding to the first index; determine that the hash of the first key is inconsistent with a stored hash stored in the first metadata, in response to reading the first metadata; determine that the collision table in the first metadata is empty, in response to determining that the hash of the first key is consistent with the stored hash stored in the first metadata; and delete the first object from the second segment, in response to reading the collision table.

According to another embodiment, a method is described comprising: receiving a get request indicating a first key; computing a first index based on a hash of the first key for an object to be retrieved from a memory device; reading a first metadata of a first segment corresponding to the first index; determining that the hash of the first key is inconsistent with a stored hash stored in the first metadata, in response to reading the metadata; reading a collision table in the first metadata to determine that the object is stored in a second segment; and retrieving the object from the second segment, in response to reading the collision table.

The collision table may include a second index based on the hash of the first key and an offset of the object that is stored in the first segment an association between the hash of the first key and the indicator of the location of the second segment.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 7 illustrates an example metadata, according to an embodiment.

Figure 1:
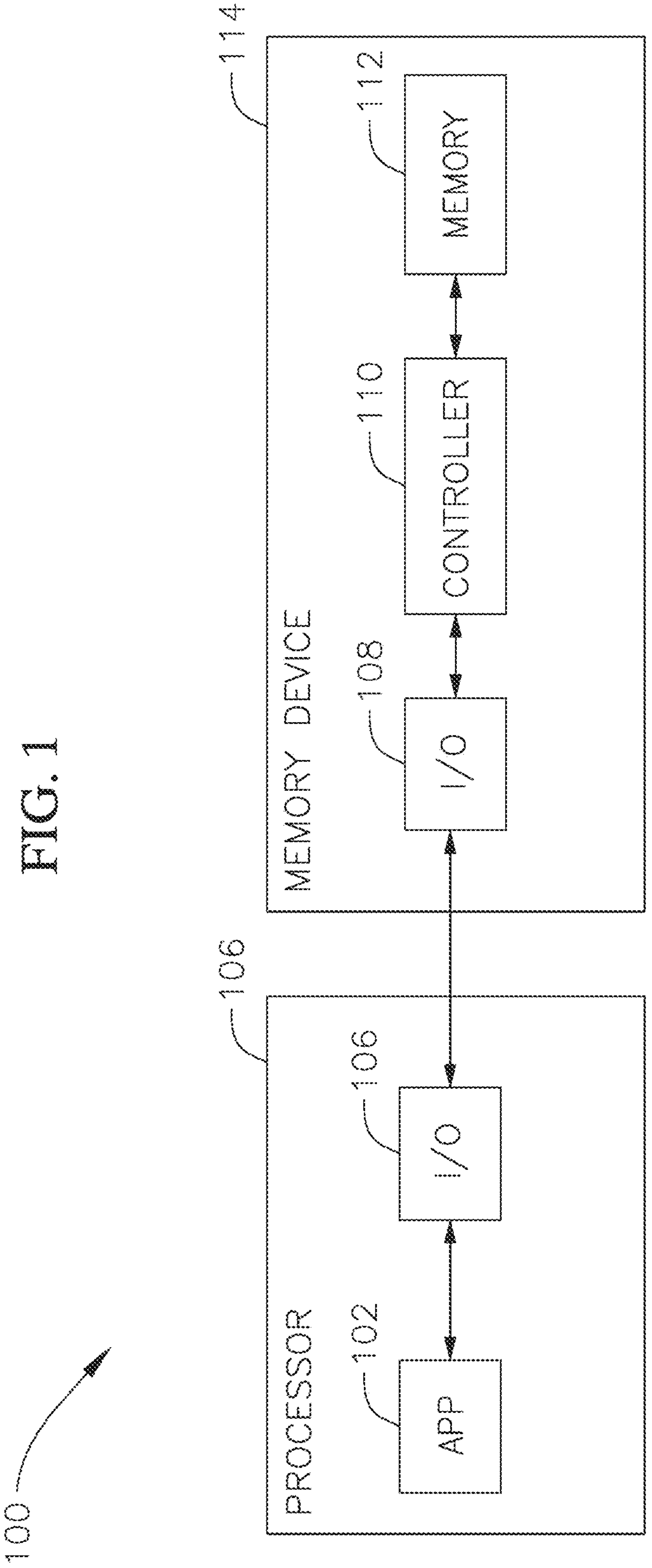
FIG. 1 is a block diagram illustrating a memory device that uses a hash based block translation for key value storage in communication with an application, according to an embodiment.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

FIG. 1 is a block diagram illustrating a system including a memory device that is configured to store information provided by an application, for example, on a computer. One example of a memory device is a solid state drive (SSD) that uses block storage techniques to store data in the SSD. In block storage devices, raw data is stored in the memory device at a certain device address, and an application provides a device block offset (often referred to as a Logical Block Addressing (LBA)) and a length of the data to be stored on the device. On the other hand, applications that use object storage understands Key-Value semantics. Therefore, a translator is needed to map a key in the object storage to a value location (e.g., LBA) in a block storage device in order to perform operations such as writing, reading, and deleting data. Thus, when it is desired to retrieve a stored object, the application (e.g., a software application) may provide the key to the memory device and a translator may map the key to a value location to retrieve the object from the memory device based on the key. Similarly, when it is desired to delete a stored object, the application may provide the key that corresponds to the object and the translator may map the key to the value location and delete the object. Therefore, by using a translator, the key used by object store applications may be mapped to value locations on the block storage device to perform device operations. However, executing such translations is often resource consuming thus slowing down the overall system, and performance may be negatively affected as the memory device is scaled in size. Therefore, more efficient techniques that do not degrade performance when scaled are desired.

Various embodiments of the present disclosure describe key value to block storage translation techniques during a put operation (e.g., storing), a get operation (e.g., retrieving), and a delete operation between an application and a memory device. In some embodiments, key value to block storage translation may be used during crash recovery or system restart operations. FIG. 1 is an example block diagram of a system 100 such as a computer that includes at least a processor 106 coupled to a memory device 114 such as, for example, an SSD for storing data. In some embodiments, the processor 106 includes an application 102, which through an I/O interface 106 of the processor 106 and an I/O interface of the memory device 114, communicates with a memory 112 that uses block storage. A controller 110 may be coupled to the memory 112 and may be configured to regulate the data traffic that flows between the memory 112 and the application 102. An example of a memory device 114 is an SSD, and the SSD may be divided into a plurality of equally sized segments. For example, a 16 TB SSD may be divided into about 4 billion equally sized 4 KB segments. However, the SSD may be divided into larger or smaller size segments based on application or an end user's preference.

According to an embodiment, an object to be stored by the application 102 has a key, and a hashing function is applied to the key to generate a hash. The hash may then be used to generate an index, and the object may be stored as a value in a segment of the memory device that corresponds to the generated index. The location of the segment within the memory device may be determined by the index generated from the hash. For example, a hashing function may be applied to a key to generate a hash (e.g., a 256 bit number) and an index may be generated based on this hash. The index may then be used to look for a segment indicator (out of the 4 billion segments) that matches the index. For example, the segment indicator may be an address or location of the segment within the device, and if a segment indicator that matches the index is found, then the object may be stored in that segment. Similarly, if it is desired to retrieve the object that is stored in the segment, the key that corresponds to the object that is going to be retrieved, may be hashed to generate an index, and the object may be retrieved from the segment based on the index. Accordingly, hashed based key value translation techniques according to various embodiments of the present disclosure provide methods that reduces resource consumptions and further improving performance when scaled in size. However, in practice, this is not as simple as it sounds. For example, the index generated from the hash may not correspond to a segment because the index may be beyond the range of segments available. That is, if there are 4 billion segments, any index number greater than 4 billion would fall outside the range. Further, in some instances, a segment corresponding to a generated index may already be occupied by an object that corresponds to another key, thus resulting in a collision by the objects. Accordingly, the embodiments of the present disclosure may implement various index generation and collision handling techniques described herein.

Figure 2:
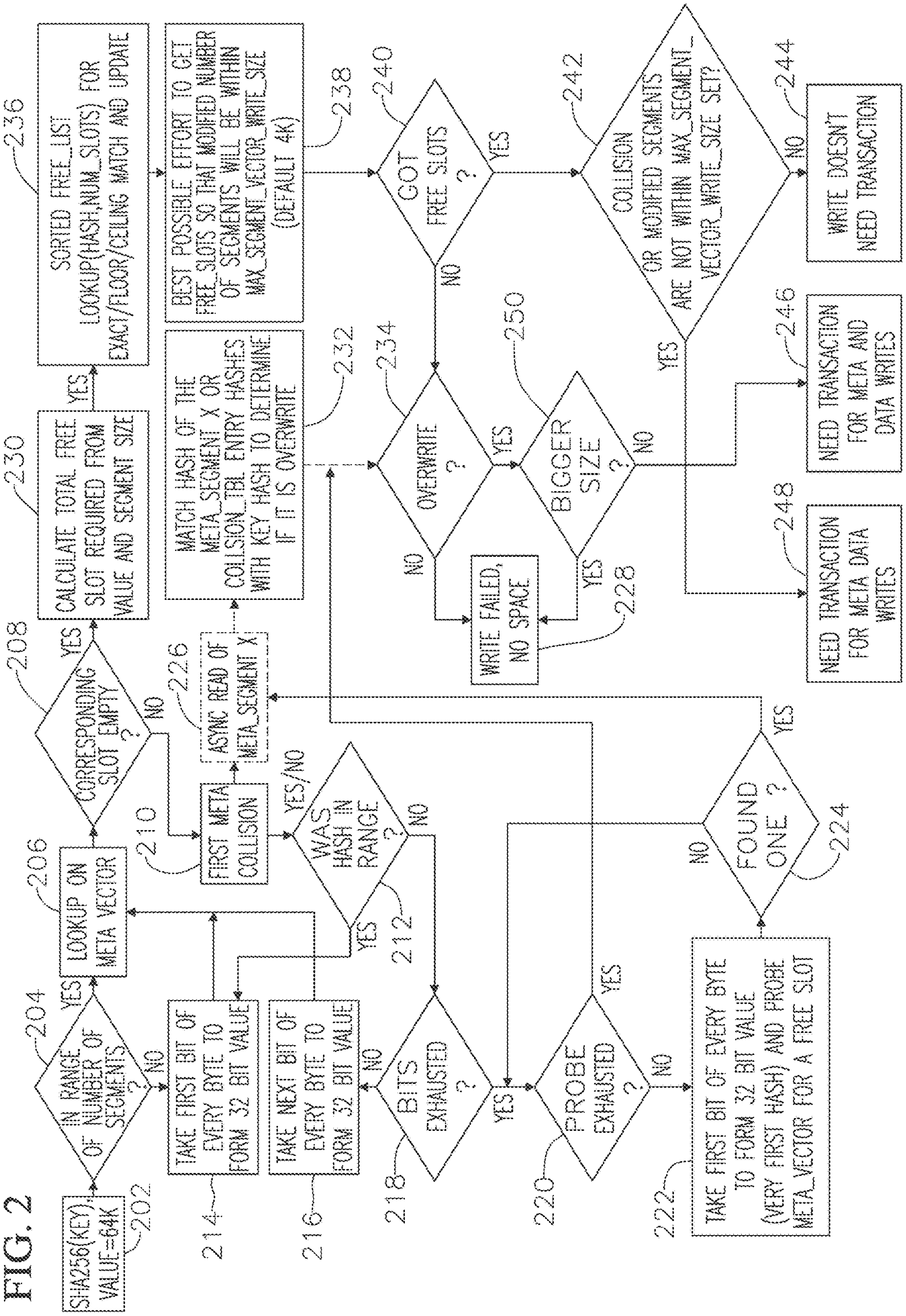
FIG. 2 is a flow chart of a method for finding an available slot on the memory device, according to an embodiment.

FIG. 2 is a flow chart of a method for finding an available slot on the memory device, according to an embodiment. In some embodiments, when an application desires to write an object on to a memory device (e.g., an SSD), various of steps are executed to put that object on to the SSD. For purposes of this disclosure, and to facilitate in describing the various embodiments of the present disclosure, a 16 TB SSD that is divided into equally sized 4 KB segments will be used as an example memory device to explain the embodiments. Thus, the 16 TB SSD is divided into approximately 4 billion segments and each segment has an associated indicator (e.g., an address or a locator). In some embodiments, each segment includes metadata corresponding to that segment, which may indicate, for example, whether the segment contains data or the segment is empty. An example of the metadata is shown in FIG. 7. In some embodiments, one segment of the memory device may be reserved as a segment vector, and within the segment vector may be a meta vector that may be used for storing metadata. The meta vector is similar to the metadata that is stored in each of the segments but is intended to quickly provide metadata information without having to read the metadata information in the individual segment.

According to one embodiment, a key that corresponds to an object is hashed to generate a numeric value (202). Various hashing techniques are known in the art and some hashing techniques may be more preferable than others. The examples described in the present disclosure uses Secure Hashing Algorithm 256 (SHA-256); however, a person skilled in the art may find other suitable hashing techniques may be used instead. In some embodiments, other techniques known to those skilled in the art may be used to generate an index from the hashed keys. Here, a SHA-256 hash generates a 256 bit number that is used to generate an index (e.g., a first index), which is the actual hashed value. In some embodiments, the index that is generated based on the hash is used to identify a segment that has a corresponding indicator (e.g., an address) on the SSD and the object is stored in that segment. However, in some instances, the index that is generated by the hashing function may not correspond to a segment, for example, because there are more potential index values than there are segments. Therefore, some indexes may fall outside of the range of segments that are available on the SSD. The number of indexes that can be generated may differ depending on the type of hashing technique used. To illustrate, the index may be a 256 bit number generated by the hashing technique while segments may have 32 bit indicators. Accordingly, segment indicator values may range from 0 to $2^{32}-1$ while the first index generated from the hash value may be between 0 and $2^{256}-1$. In other cases, the index may correspond to a segment that is not available, for example, because that segment may already be occupied by another object based on another key. Therefore, the embodiments of the present disclosure provides techniques to more efficiently find a corresponding segment that is available for storing the object.

Accordingly, after a first key is hashed, a 256 bit index (e.g., a first index) is generated based on a hash of the first key (202) and a determination is made as to whether or not the first index is within a range of corresponding segment indicators (204) (e.g., $[0 \ldots 2^{32}-1]$). If the first index is not within the range of corresponding segment indicators, then another index (e.g., a second index) is generated based on the same hashed value of the first key to determine whether the second index falls within the range of segment indicators. As noted above, the first index is the actual hashed value resulting from the hashing function, whereas the second index is a new value that is generated based off of the hashed value. Thus, according to one embodiment, the second index may be generated by extracting a first bit from each byte of the 256 bit hash to generate the new index (e.g., a second index) (214). That is, the 256 bit hash has 32 bytes, and the first bit out of each of the 32 bytes is extracted and combined to generate a new 32 bit index (e.g., second index). If the second index falls within the range of segment indictors, then a meta vector of the segment corresponding to the second index is read (206) to determine whether the segment is empty or occupied by another object (208). If the segment is empty, then that segment is available for the object to be written. On the other hand, if the segment is occupied by another object, then that is an indication of a collision, where multiple objects, each corresponding to a different key have a common index. In such case, information regarding the collision may be stored in the metadata to facilitate sorting out the collision.

According to an embodiment, the metadata of a segment in which a first object is stored includes a collision table that may contain information related to a second object that has collided with the first object (e.g., a common index corresponding to the segment has been generated for both the first and second object). For example, the collision table (or other data structures) may be an array of information that can include an offset of the second object (e.g., indicating a distance of another segment storing information related to the second object from the segment) that collided with the first object at the segment and a hash of the key corresponding to that second object. Thus, if a collision has not occurred, then the collision table may be empty, but whenever a collision occurs, the collision table may be updated to include the array of information related to the second object that collided with the first object in that segment. For example, a first object corresponding to a first key is stored in a segment. At this point, the collision table is still empty because the segment was available and therefore no collision exists. Then, an index corresponding to a second key for a second object points to the same segment that the first object is stored in. This results in a collision because the segment is already occupied by the first object. In this case, the second object will be stored in a different segment and the collision table may be updated with information regarding the actual location of the second object. Thus, when it is later desired to retrieve the second object, and the second index for the second key points to the segment that contains the first object, the collision table can point to the actual location of the second object. Further details of retrieving the object will be described in more detail later.

Referring back to step (208), when a determination is made that the selected segment already contains an object, a collision exists. In this case, if this is the very first occasion of a collision, then a collision table does not yet exist, and therefore the collision table is empty. If this is not the first collision (e.g., a collision has already occurred before), then a collision table likely already exists. If the collision table already exists, then a determination is made whether or not the collision table has been read (210). If the collision table has not yet been read or the collision table is still empty, then the metadata is further read to determine which key is associated with the object that is stored in the segment, and the collision table may be updated with this information if this is not in the collision table (226). Next, the hash that was read from the metadata or the collision table (if the collision table was already present) is compared with the hash of the current key, and if they match, then it is an overwrite condition (232). The process for the overwrite condition will be described later.

At the same time as steps (226) and (232) are being performed, a determination is made whether the index (e.g., first index) that was determined at step (204) was in the range of segment indictors (212). If it was in range, then a first bit out of each byte of the 256 bit hash is extracted to generated a new index (e.g., second index) (214). If it was not in range, then the second index was already generated previously at step (214) so a third index is generated by extracting a second bit of each byte of the 256 bit hash (i.e., based off of the hashed value) to generate another index (216).

In some embodiments, if the index generation of extracting bits from each byte has been executed eight iterations, then all 8 bits of each byte of the 256 bit hash are exhausted and no more bits are available to generate a new index. Therefore, if all bits are exhausted (218), then the segments on the memory device are probed one segment at a time (220, 222). More specifically, the probing process may be performed by extracting a first bit from every byte again to generate the first index to establish a starting point (this is the same first index that was generated at step (202)). Then the meta vector of each segment is probed until a free segment is found (222). Once a free segment is found (224), then the metadata corresponding to the free segment is read (226), and a determination is made whether the segment should be overwritten as previously described above, by comparing the index of segment that was found through probing with the metadata or the collision table (232, 234). If they match, then it is an overwrite condition but if they do not match, then it is not an overwrite condition. If it is not an overwrite condition, and an empty slot is not available (because the probing has been exhausted), then the write has failed because there is no space (228). On the other hand, if it is an overwrite condition, then a determination is made whether the segment is big enough to write the object in that segment (250). If the segment is not the big enough, then the segment has insufficient space and the write has failed (228). If the segment is the big enough, then the overwrite may occur because the object can fit in that segment, and a transaction is processed and the metadata and the object may be written to the segment (246).

Turning back to step (216), once a new index is generated by extracting the second bit from each byte, the meta vector in the corresponding segment is read (206) to determine whether that segment is empty or occupied (208). In some embodiments, this process is repeated until an empty segment is found.

In some embodiments, once an available segment is identified, the total number of segments that are needed to store the object based on the size of the object is determined (230). For example, if the object size is 8 KB and each segment is 4 KB, then two segments are needed to store the object. In some embodiments, a free list is consulted to determine which segment and where the free slots corresponding to the segment are located. For example, if two segments are needed to write the 8 KB object and the two segments are adjacent, then the entire object may be written in one disk write.

In some embodiments, a free list may be available on a portion of the memory device. The free list may be a list that shows the location of a segment offset and a number of the free segments, and the free list is constantly updated with the status of the available segments. Accordingly, once the total number of free segments required is calculated at step (230), the free list may be consulted to determine a segment that is an exact match based on the size of the object to be written (e.g., a 4 KB segment for a 4 KB object, or two 4 KB segments for an 8 KB object) (236), and the best possible solution to get these free segments so that a modified number of segments may be within a maximum threshold disk write (e.g., one disk write size limit) (238). In other words, the free list optimizes the best way to use the available segments in a smaller number of disk writes (e.g., one disk write) by determining the best possible solution, which is where the multiple segments are sequential. Next a determination is made as to whether the required free segments have been found (240). If the segments are found, then a determination is made as to whether or not the collision or modified segments are not within the maximum one disk write size limit (242). In other words, if the multiple segments are sequential or within a range on one disk write granularity, then the data write may be executed in one write and no transaction is needed, but if the multiple segments are not sequential or not within one disk write granularity, then a transaction is needed (i.e., more than one disk write) to write to the multiple segment, thus not within the maximum one disk write limit. If the collision or modified segments are not within the size of the segments, then a transaction is needed for metadata (248). If the collision or modified segments are within the size of the segments, then a transaction is not needed (244).

Turning back to step (240) if it is determined that that segments are not found, then a determination is made whether or not this is an overwrite (234). If it is not an overwrite, then the write process has failed (228). If it is an overwrite, then a determination is made whether the segment is the big enough based on the size of the object (250). If the segment is not big enough, then the segment has failed (228). If the segment is big enough, then a transaction is processed and the metadata and the object may be written to the segment because no free segments are available (246). Accordingly, the flow chart of FIG. 2 may be used to determine whether a transaction is needed for metadata writes (248), whether a transaction is needed for both metadata and object writes (246), or whether no transactions are needed (244).

Figure 3:
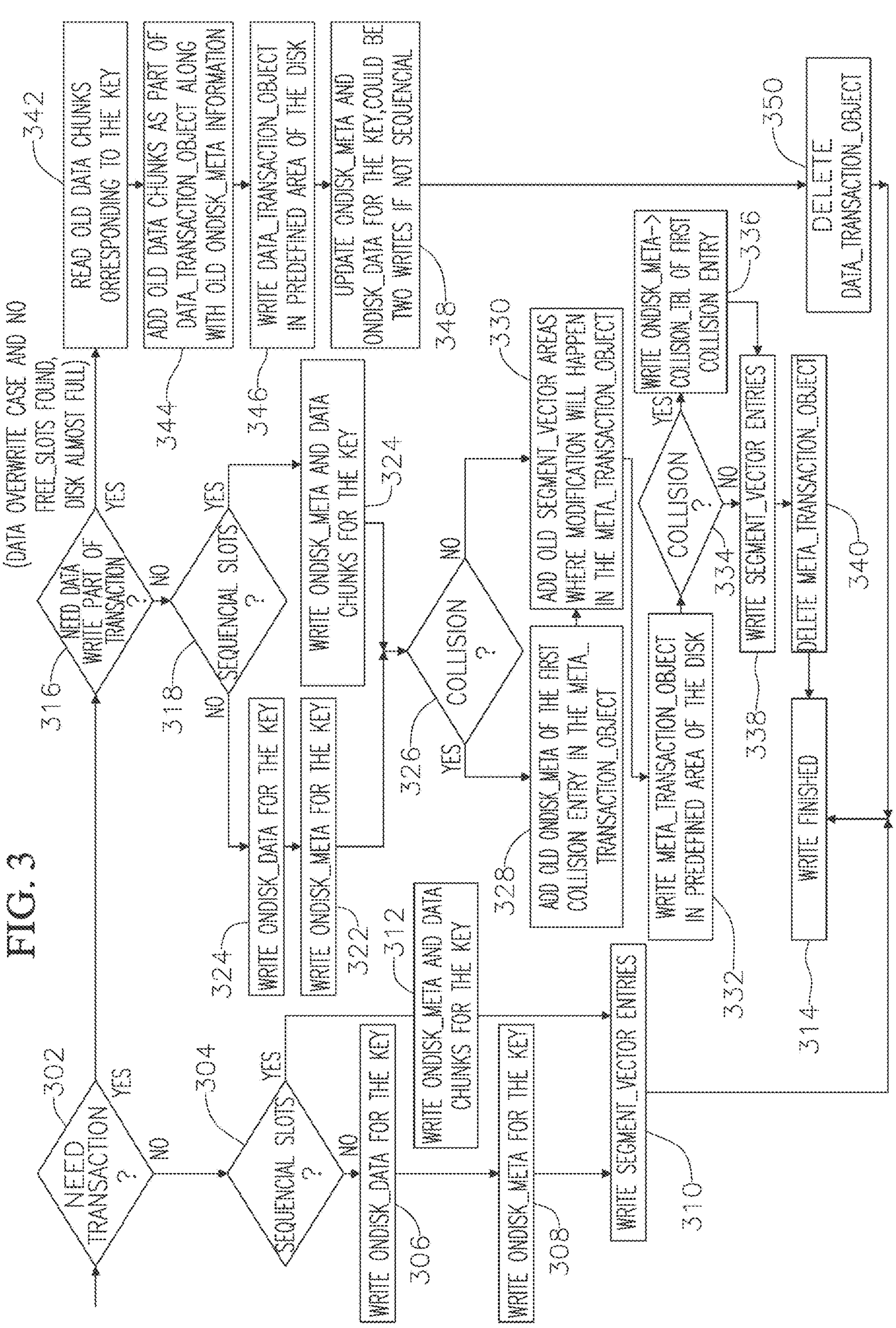
FIG. 3 is a flow chart of a method for putting an object on to the available slot on the memory device, according to an embodiment.

FIG. 3 is a flow chart of a method for putting an object on to one or more slots of the memory device once available slots are identified. According to an embodiment, a one of two paths are selected based on the outcomes from FIG. 2, whether or not a transaction is needed (302). For example, if it is determined that a transaction is not needed, then a determination is made whether the metadata and the object can be written to multiple sequential segments, for example, based on whether the free slots found at step (238) of FIG. 2 are sequential (304). If it can be written to sequential segments, then the metadata and the object are both written at the same time (312), and a segment vector is updated (310), and the write process is finished (314). In some embodiments, a segment vector may be a portion on the memory device, for example at the beginning of the SSD, and may include a bit based indicator of a status of each segment. For example, the indicator may be a two bit indicator that represents the status of each segment as available, metadata, data chunk (or object), or collision entry. Accordingly, the meta vector may be referenced to quickly determine a status of any segment on the memory device. Because each segment is represented by just two bits, the example 16 TB SSD having 4 billion segments consumes about 950 MB of memory space. In some embodiments, the free list is also referenced and updated accordingly.

Turning back to step (304), if is it determined that the metadata and the object cannot be written to multiple sequential segments, then the object is written (306) and then the metadata is written (308) in separate writes. In some embodiments, if the object cannot be written to multiple sequential segments, then the object may be written in several writes, for example, a first half of the object may be written and then a second half of the object may be written, followed by writing of the metadata. Next, the segment vector is updated (310), and the write process is finished (314).

Turning back to step (302), if it is determined that a transaction is needed, then a determination is made whether a transaction for just a meta data write is needed as determined at step (248) in FIG. 2 or whether a transaction for both metadata and object write is needed as determined at step (246) of FIG. 2 (316). If it is determined that the object part is not needed (i.e., only the metadata write is needed), then a determination is made whether the metadata and the objects can be written to sequential segments (318). If it is determined that the metadata and the object cannot be written to sequential segments, then the object is written (320) and then the metadata is written (322). If it is determined that the metadata and the object can be written to sequential segments, then the metadata and the objects are both written at the same time (324). Next, one of two paths are taken based on whether or not there was a collision, e.g., as determined at step (208) of FIG. 2 when it was determined whether or not the segment was not empty (326). If there was a collision, then an old metadata from the first collision entry (e.g., the metadata corresponding to the object that was already stored in the segment when the collision was determined at step (208) of FIG. 2) is added to a meta transaction object (328) and then an old segment vector area where a modification will happen is added to the meta transaction object (330). On the other hand, if there is no collision, then step (328) is skipped and the old segment vector area where a modification will happen is added in the meta transaction object (330). Next, the meta transaction object may be written in a predefined area of the memory device (332). Next, one of two paths are taken based on whether or not there was a collision, e.g., as determined at step (208) of FIG. 2 where it was determined whether or not the segment was not empty (334). If there was no collision (334), then the segment vector is updated (338) and then the meta transaction object is deleted (340). On the other hand, if there was a collision, then the collision table is updated with an offset or other location indicator of the segment where metadata for the object that was just written is stored (336), the segment vector entry is written by updating with entries corresponding to the segments that were just modified (338), and then the meta transaction object is deleted once the write has succeeded (340). Accordingly, the write operation is complete (314).

Turning back to step (316), if a determination is made that the object writing part of the transaction is needed, then the old objects that correspond to the key is read (342). Then the old objects are added as part of data transaction object along with old ondisk meta information (344). Then the data transaction object may be written in a predefined area of the memory device (346). Next, the metadata and the object for the key are updated (348), and the data transaction object is deleted (350). Accordingly, the write operation is complete (314).

Figure 4:
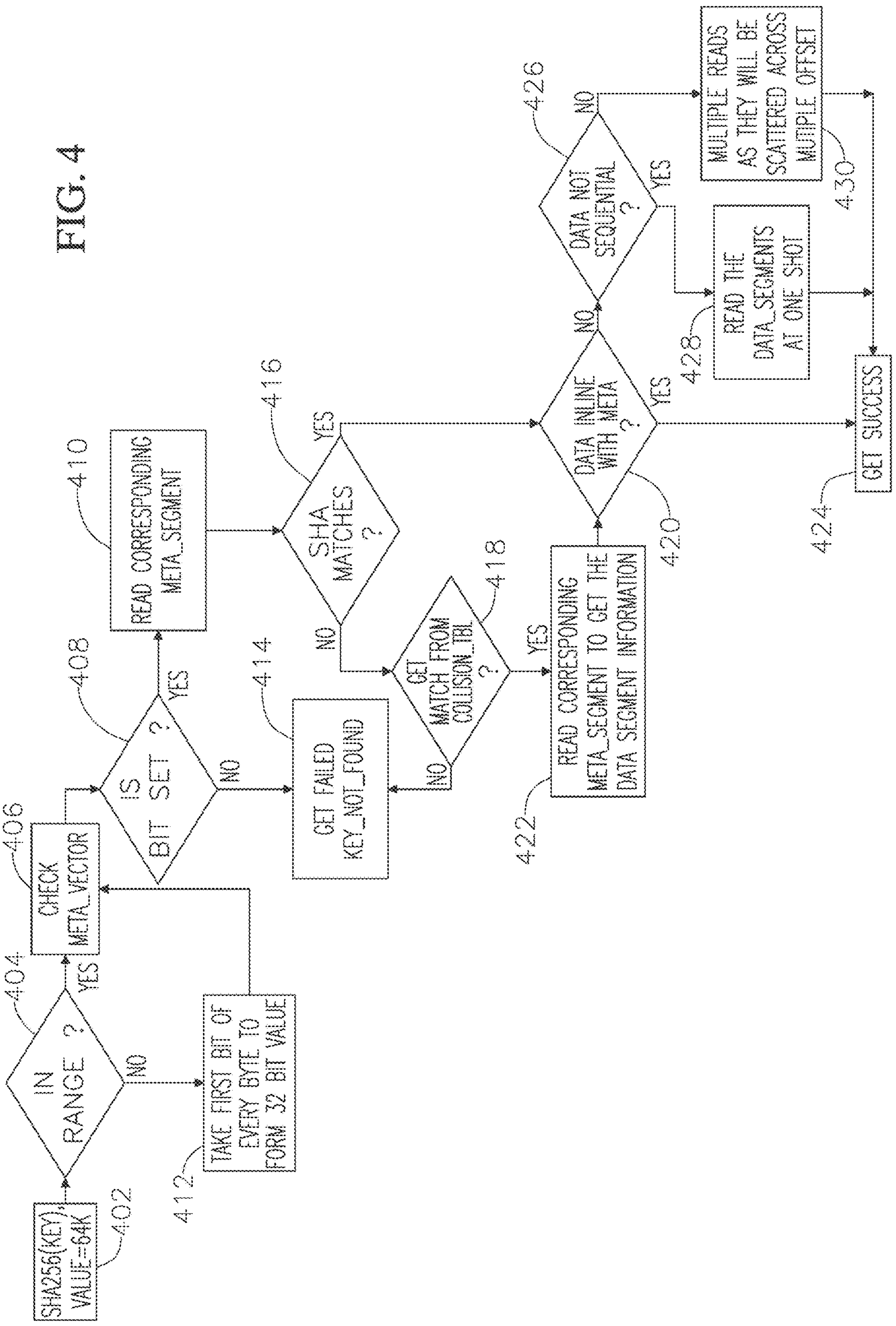
FIG. 4 is a flow chart of a method for getting an object from the memory device, according to an embodiment.

FIG. 4 is a flow chart of a method for getting an object from the memory device. According to an embodiment, when an application desires to retrieve an object from the memory device, the application may provide a key corresponding to that object, and the object may be retrieved from the memory device. Similar to the put operation, in the get operation, the key value to object storage translation is performed between the application that is requesting to retrieve the object and the memory device where the object is stored. In some embodiments, the key corresponding to the object is hashed to generate a first index based on the hash of the key (402). In some embodiments, the same hashing technique that was used when writing the object is used during the get operation. Accordingly, a SHA-256 hashing technique may be used. However, other hashing techniques may also be suitable as long as that same hashing technique was used to write the object. In some embodiments, other techniques known to those skilled in the art may be used to generate an index from the hashed keys. Once the first index is generated, a determination is made as to whether or not the first index is within the range of corresponding segment indictors of the memory device (404). If the first index is not within the range of corresponding segment indicators, then a first bit from of each of the 32 bytes of the hash is extracted and then combined to generate a new 32 bit index (e.g., a second index) (412). In some embodiments, if the generated first index is within the range of the corresponding segment indicators, the application checks for the presence of a meta vector for the segment corresponding to the first index (406). In some embodiments, this determination may be made by checking a bit-based status indicator that indicates the presence of the metadata (408). If there is no metadata, then the get operation has failed because an object that corresponds to the hashed key is not found (414). If the metadata is present, then the metadata is read (410) and a determination is made whether the hash of the first key matches or is inconsistent with a stored hash stored in the metadata (416). If the hash matches, and the object is in the same segment as the metadata (420), then the object may be retrieved and the get is successful (424). If the object is not in the same segment as the metadata, then a determination is made as to whether or not the data chunks of objects are sequentially stored (426). If the objects are sequentially stored, then the entire object is read and retrieved in one read (428). If the objects are not sequentially stored, then the objects are read in multiple reads because the objects are scattered across multiple offsets (e.g., non-continuous segments) (430).

Turning back to step (416), if the hash of the first key does not match with the stored hash stored in the metadata, then the collision table entries are consulted to check if any of the hash key matches there (418). If the collision table does not provide a segment, then the get process has failed because the object is not found (414). If the collision table contains an indicator that indicates which segment the object is located in, then the metadata at that corresponding segment is read (422), and then a determination is made whether the object is in the same segment as the metadata (420) as previously described. Accordingly, the get operation may be performed efficiently even when there is a collision because the collision table in the metadata is updated during the put operation. Thus, when there is a collision during get, the collision table may be used to determine in which segment the object is actually located.

Figure 5:
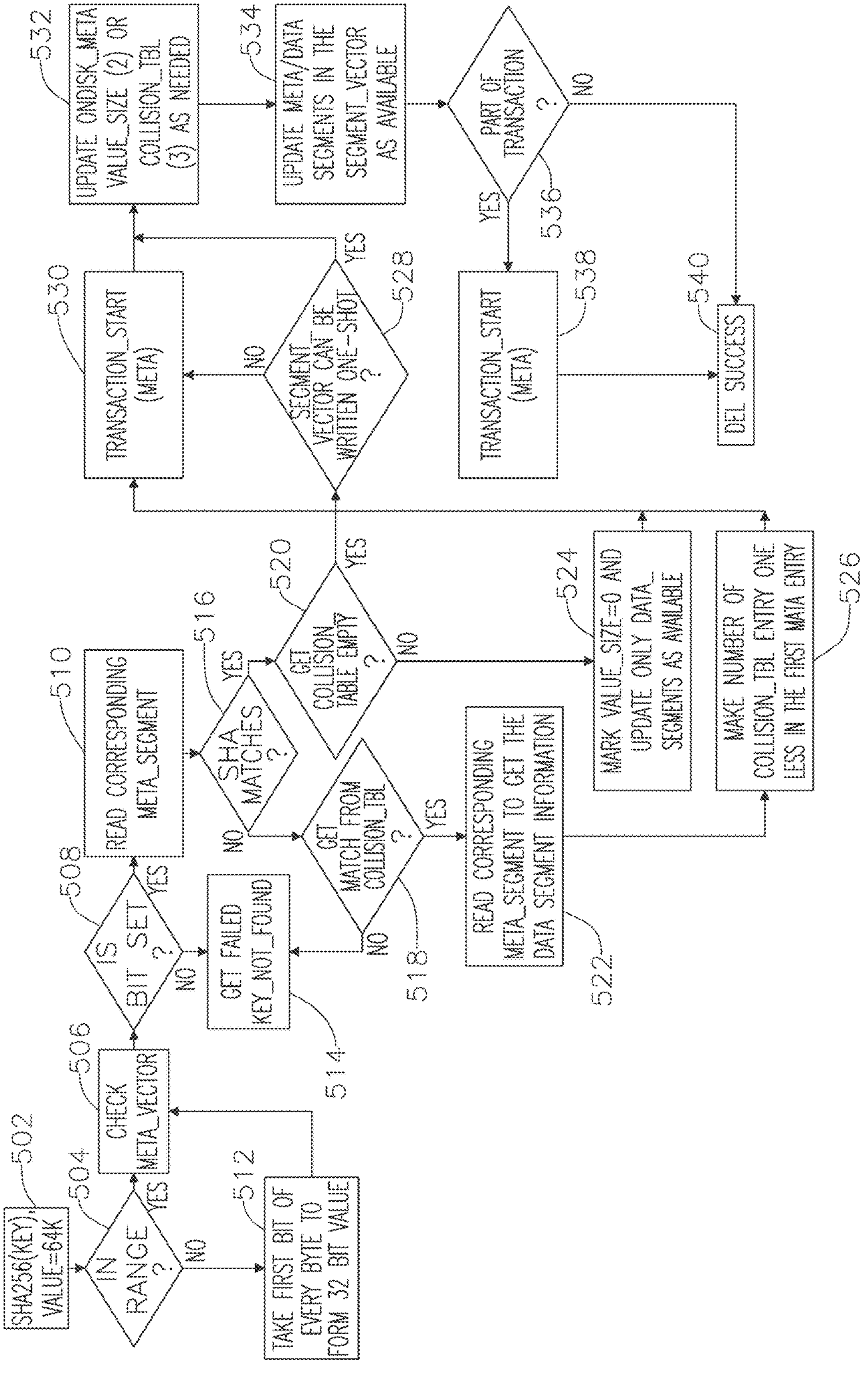
FIG. 5 is a flow chart of a method for deleting an object on the memory device, according to an embodiment.

FIG. 5 is a flow chart of a method for deleting an object from the memory device. According to an embodiment, the process for deleting an object is similar to the get operation. Accordingly, the key corresponding to the object that is to be deleted is hashed to generate a first index based on the hash of the key (502). In some embodiments, the same hashing technique that was used when writing the object is used during the delete process. Accordingly, a SHA-256 hashing technique may be used. However, other hashing techniques may also be suitable as long as that same hashing technique was used to write the object. Once the first index is generated, a determination is made as to whether or not the first index is within the range of corresponding segment indictors of the memory device (504). If the first index is not within the range of corresponding segment indicators, then a first bit from each of the 32 bytes of the index is extracted and then combined to generate a new 32 bit index (e.g., a second index) (512). In some embodiments, if the first generated index is within the range of the corresponding segment indicators, the system checks for the presence of a meta vector for the segment corresponding to the index (506). In some embodiments, this determination may be made by checking a bit-based status indicator that indicates the presence of the metadata (508). If there is no metadata, then the delete process has failed because an object that corresponds to the hashed key is not found (514). If the metadata is present, then the metadata is read (510) and a determination is made whether the hash of the first key matches or is inconsistent with the stored hash stored in the metadata (516). If the hash matches, and the collision table is empty, then there is no collision and the object in the corresponding segment may proceed to delete the object (520). Next, a determination is made whether the segment vector can be written in one write (528). If it cannot be written in one write, then a transaction is started (530). If it can be written in one write, then the transaction start is skipped and the ondisk meta value size or collision table is updated as necessary (532). Next, the metadata and object segments in the segment vector are updated to indicate that they are now available (534). Next a determination is made whether the write is part of a transaction (536). If is it not part of the transaction, then the delete process ends (540). If it is part of a transaction, then the transaction is ended first (538) and then the delete process ends (540).

Turning back to step (524), if the collision table is not empty, then a value size indicator in the metadata may be set to zero (524). Here, a value size of zero indicates that the object that was stored in the segment has already been deleted therefore it should not be read during future delete or get operations. Once the value size is set to zero, then the object in the corresponding segment(s) (indicated by the metadata) may be deleted.

In some embodiments, when the metadata is read at step (510) and the hash of the first key does not match and is therefore inconsistent with the stored hash stored in the metadata (516), then the collision table is read to determine which segment contains the actual metadata that corresponds to the object (518), and this metadata is read (522). If the hash stored in the metadata matches the hash of the key, then the number of collision table entry is reduced by one (526), and the object may be deleted. If the hash stored in the metadata does not correspond to the hash of the key, then the delete process has failed (514).

Figure 6:
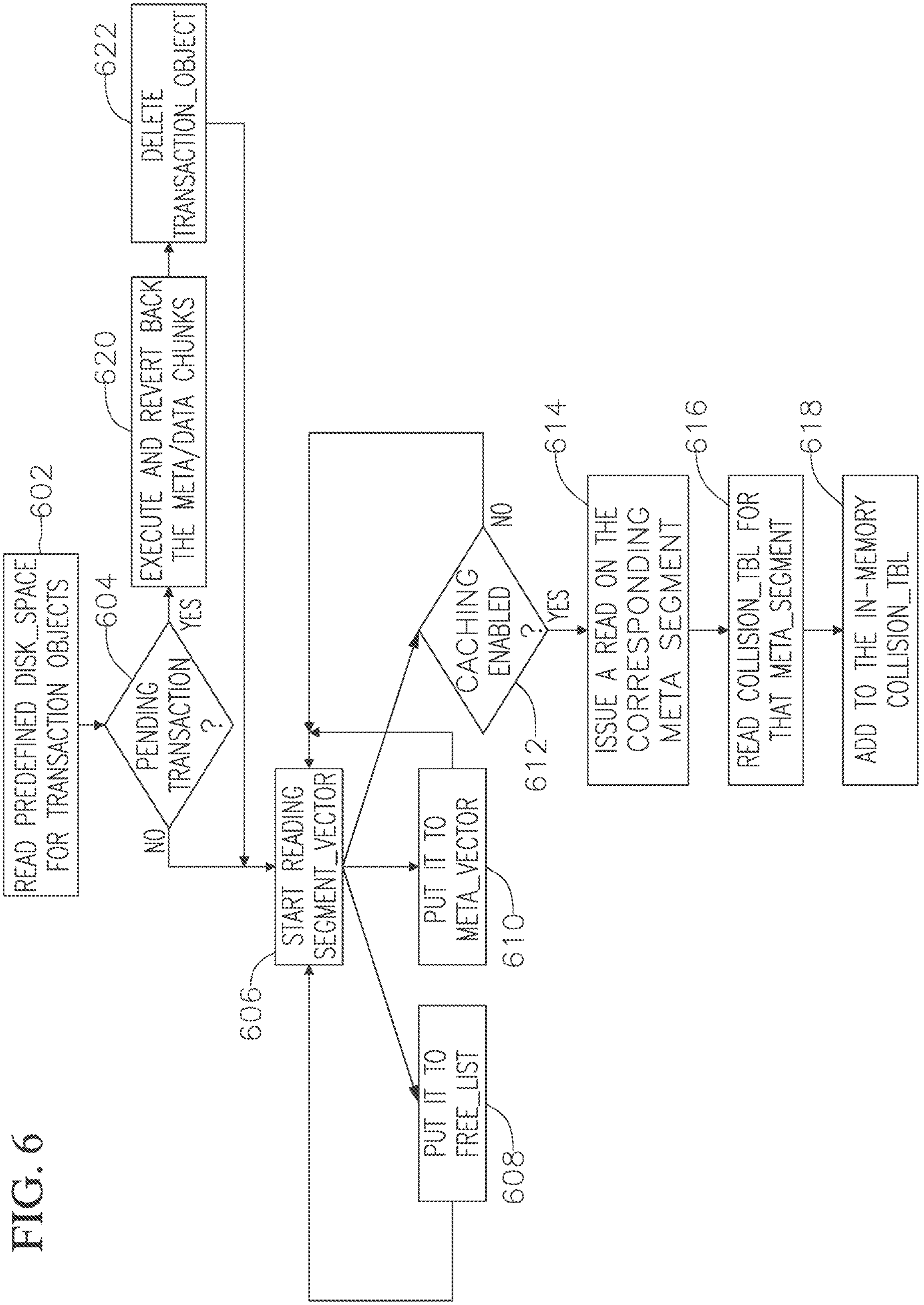
FIG. 6 is a flow chart of a method for recovering from system crash or restart.

FIG. 6 is a flow chart of a method for recovering from a system crash or a restart. When a system or application crashes during a disk operation such as a write operation, the data has the potential to become corrupt. Thus, according to an embodiment, methods for recovering the data are described. In some embodiments, when the system is restarted after a crash, a predefined disk space used for transaction objects is read (602) to determine whether or not there were any pending or unfinished transactions (604). If there were any pending transactions, then the transactions are executed and the metadata and the objects are reverted (620). Once that is done, the transaction object may be deleted (622). If there were no pending transactions, then steps (620) and (622) are skipped, and the segment vector is read (606), and the free list (608) and the meta vector (610) are formed in the memory. If caching is enabled to store the collision table (612), the corresponding metadata is read from the cache (614) and the collision table corresponding to that metadata is also read from the cache (616), and this information is added to the collision table that is stored in the cache as well as in the metadata (618). Accordingly, even when the system or application crashes, upon restart, any pending transactions may be recovered and restored. Accordingly, hashed based key value translation techniques according to various embodiments of the present disclosure provide methods that reduces resource consumptions and further improving performance when scaled in size.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

The electronic or electric devices and/or any other relevant devices or components according to embodiments of the present invention described herein may be implemented utilizing any suitable hardware, firmware (e.g. an application-specific integrated circuit), software, or a combination of software, firmware, and/or hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present invention.

It will be understood that any of the components or any combination of the components described throughout the present disclosure may be used to performed one or more of the operations described in the flow charts. Moreover, the described operations are merely example operations and may involve various additional steps that are not explicitly described herein. Additionally, the temporal order of the operations may be varies.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are examples only. One skilled in the art may recognize various alternative embodiments from those specifically disclosed. Those alternative embodiments are also intended to be within the scope of this disclosure. As such, the embodiments are limited only by the following claims and their equivalents.

What is claimed is:

1. A method comprising:

computing a first index based on a first key for a first object;

storing the first object in a first segment corresponding to the first index;

computing a second index based on a second key for a second object, wherein the second index corresponds to the first segment;

based on the first object being stored in the first segment, the second object being different from the first object, and the second index corresponding to a same location as the first object in the first segment, computing a third index based on the second key for the second object, wherein the third index corresponds to a second segment;

storing the second object in the second segment;

updating a data structure associated with the first segment with information indicating a location of the second object; and reading the second object from the second segment, based on the data structure associated with the first segment.

2. The method of claim 1, wherein the updating of the data structure associated with the first segment comprises updating the first segment to include an indicator of the second segment.

3. The method of claim 2, wherein the indicator of the second segment is stored in the data structure in the first segment.

4. The method of claim 3, wherein the first index is computed based on a hash of the first key for the first object, and the second index is computed based on a hash of the second key for the second object, and wherein the data structure is in a first metadata of the first segment.

5. The method of claim 4, wherein the computing the second index comprises extracting a bit from every byte of the hash to form the second index.

6. The method of claim 4, further comprising writing, to the data structure, an association between the hash of the first key and the indicator of the second segment, in response to the data structure being empty.

7. The method of claim 4, wherein the computing the hash of the first key comprises computing using a Secure Hash Algorithm 256 (SHA-256).

8. The method of claim 4, further comprising:

receiving a get request indicating the first key;

computing the first index based on the hash of the first key;

reading the first metadata of the first segment corresponding to the first index;

determining that the hash of the first key is inconsistent with a stored hash in the first metadata, in response to reading the first metadata;

reading the data structure in the first metadata to determine that the first object is stored in the first segment; and retrieving the first object from the first segment, in response to reading the data structure.

9. The method of claim 4, further comprising:

receiving a delete request identifying the first key;

computing the first index based on the hash of the first key;

reading the first metadata of the first segment corresponding to the first index;

determining that the hash of the first key is inconsistent with a stored hash in the first metadata, in response to reading the first metadata;

reading the data structure in the first metadata to determine that the first object is stored in the first segment; and deleting the first object from the first segment, in response to reading the data structure.

10. The method of claim 4, further comprising:

receiving a delete request identifying the first key;

computing the first index based on the hash of the first key;

reading the first metadata of the first segment corresponding to the first index;

determining that the hash of the first key is consistent with a stored hash stored in the first metadata, in response to reading the first metadata;

determining that the data structure in the first metadata comprises the indicator of the second segment;

setting a value size of the data structure to zero; and deleting the first object from the first segment.

11. The method of claim 4, further comprising:

receiving a delete request identifying the first key;

computing the first index based on the hash of the first key;

reading the first metadata of the first segment corresponding to the first index;

determining that the hash of the first key is consistent with a stored hash stored in the first metadata, in response to reading the first metadata;

determining that the data structure in the first metadata is empty, in response to determining that the hash of the first key is consistent with the stored hash in the first metadata; and deleting the first object from the first segment, in response to reading the data structure.

12. An object storage system configured to store objects, the object storage system comprising a memory device that is divided into segments, the memory device configured to:

compute a first index based on a first key for a first object;

store the first object in a first segment corresponding to the first index;

compute a second index based on a second key for a second object, wherein the second index corresponds to the first segment;

based on the first object being stored in the first segment, the second object being different from the first object, and the second index corresponding to a same location as the first object in the first segment, compute a third index based on the second key for the second object, wherein the third index corresponds to a second segment;

store the second object in the second segment;

update a data structure associated with the first segment with information indicating a location of the second object;

update the first segment to include an indicator of the second segment; and read the second object from the second segment, based on the data structure associated with the first segment.

13. The object storage system of claim 12, wherein the indicator of the second segment is stored in the data structure in the first segment.

14. The object storage system of claim 13, wherein the first index is computed based on a hash of the first key for the first object, and the second index is computed based on a hash of the second key for the second object, and wherein the data structure is in a first metadata of the first segment.

15. The object storage system of claim 14, wherein the computing the second index comprises extracting a bit from every byte of the hash to form the second index.

16. The object storage system of claim 14, wherein the memory device is further configured to write to the data structure, an association between the hash of the first key and the indicator of the second segment, in response to the data structure being empty.

17. The object storage system of claim 14, wherein the memory device is further configured to:

receive a get request indicating the first key;

compute the first index based on the hash of the first key;

read the first metadata of the first segment corresponding to the first index;

determine that the hash of the first key is inconsistent with a stored hash stored in the first metadata, in response to reading the first metadata;

read the data structure in the first metadata to determine that the first object is stored in the first segment; and retrieve the first object from the first segment, in response to reading the data structure.

18. The object storage system of claim 14, wherein the memory device is further configured to:

receive a delete request identifying the first key;

compute the first index based on the hash of the first key;

read the first metadata of the first segment corresponding to the first index;

determine that the hash of the first key is inconsistent with a stored hash stored in the first metadata, in response to reading the first metadata;

read the data structure in the first metadata to determine that that the first object is stored in the first segment; and delete the first object from the first segment, in response to reading the data structure.

19. A method comprising:

computing a first index based on a first key for a first object;

storing the first object in a first segment corresponding to the first index;

computing a second index based on a second key for a second object, wherein the second index corresponds to the first segment;

based on the first object being stored in the first segment, the second object being different from the first object, and the second index corresponding to a same location as the first object in the first segment, computing a third index based on the second key for the second object, wherein the third index corresponds to a second segment;

storing the second object in the second segment;

updating a data structure associated with the first segment with information indicating a location of the second object; and reading the second object from the second segment, based on the data structure associated with the first segment, wherein the first index is computed based on a hash of the first key for the first object, and the second index is computed based on a hash of the second key for the second object.

20. The method of claim 19, further comprising:

updating the first segment to include an indicator of the second segment, wherein the indicator of the second segment is stored in the data structure in the first segment.

* * * * *